(12) United States Patent
Ross et al.

(10) Patent No.: US 10,191,758 B2
(45) Date of Patent: Jan. 29, 2019

(54) DIRECTING DATA TRAFFIC BETWEEN INTRA-SERVER VIRTUAL MACHINES

(71) Applicant: vArmour Networks, Inc., Mountain View, CA (US)

(72) Inventors: Colin Ross, Arlington, TX (US); Choung-Yaw Shieh, Palo Alto, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 14/964,318

(22) Filed: Dec. 9, 2015

(65) Prior Publication Data

US 2017/0168864 A1 Jun. 15, 2017

(51) Int. Cl.
*G06F 9/455* (2018.01)
*H04L 12/755* (2013.01)
(Continued)

(52) U.S. Cl.
CPC ........ *G06F 9/45558* (2013.01); *H04L 45/021* (2013.01); *H04L 45/586* (2013.01);
(Continued)

(58) Field of Classification Search
CPC .................................................. G06F 9/45558
See application file for complete search history.

(56) References Cited

U.S. PATENT DOCUMENTS 6,253,321 B1 6/2001 Nikander et al.
6,484,261 B1 11/2002 Wiegel
(Continued)

FOREIGN PATENT DOCUMENTS

TW 201642616 A 12/2016
TW 201642617 A 12/2016
(Continued)

OTHER PUBLICATIONS

Ido Dubrawsky, Firewall Evolution—Deep Packet Inspection, Symantec, Created Jul. 28, 2003 Updated Nov. 2, 2010, symantec.com/connect/articles/firewall-evolution-deep-packet-inspection, Retrieved on May 13, 2016.*

(Continued)

*Primary Examiner* — Eric C Wai
*Assistant Examiner* — Jorge A Chu Joy-Davila
(74) *Attorney, Agent, or Firm* — Carr & Ferrell LLP

(57) ABSTRACT

Systems and methods for improving data communications between intra-server virtual machines are described herein. An example method may commence with receiving, from a first virtual machine, a data packet directed to a second virtual machine, routing the data packet via an external routing environment, and receiving the data packet allowed for delivery to the second virtual machine. Based on the receipt, it may be determined that a data flow associated with the data packet is allowed, and a unique identifier of the first virtual machine may be replaced with a first unique identifier and a unique identifier of the second virtual machine may be replaced with a second unique identifier. The first and second unique identifiers may be associated with corresponding interfaces of the intra-server routing module and used to direct the data flow internally within the server between the first virtual machine and the second virtual machine.

15 Claims, 10 Drawing Sheets

(51) Int. Cl.
*H04L 12/713* (2013.01)
*H04L 12/741* (2013.01)
*H04L 29/12* (2006.01)

(52) U.S. Cl.
CPC .......... *H04L 45/74* (2013.01); *H04L 61/6022* (2013.01); *G06F 2009/4557* (2013.01); *G06F 2009/45595* (2013.01)

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1* | 4/2009 | Kloth .................. H04L 49/602 370/392 |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,798,055 B1 | 8/2014 | An |
| 8,813,169 B2 | 8/2014 | Shieh et al. |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2* | 1/2015 | Feng .................. G06F 9/06 370/389 |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,027,077 B1 | 5/2015 | Bharali et al. |
| 9,036,639 B2* | 5/2015 | Zhang .................. H04L 45/74 370/392 |
| 9,060,025 B2 | 6/2015 | Xu |
| 9,141,625 B1 | 9/2015 | Thornewell et al. |
| 9,191,327 B2 | 11/2015 | Shieh |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2004/0172557 A1 | 9/2004 | Nakae et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | van Rietschote et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0083445 A1* | 3/2009 | Ganga .................. G06F 15/16 709/250 |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Birnbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |

(56) References Cited

U.S. PATENT DOCUMENTS

| | | |
|---|---|---|
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1* | 4/2011 | Droux .................. H04L 49/00 370/411 |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1* | 8/2012 | Rolette ............... G06F 21/577 726/13 |
| 2012/0278903 A1 | 11/2012 | Pugh |
| 2012/0284792 A1 | 11/2012 | Liem |
| 2012/0297383 A1* | 11/2012 | Meisner .................. G06F 3/165 718/1 |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0081142 A1 | 3/2013 | McDougal et al. |
| 2013/0086399 A1 | 4/2013 | Tychon et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1* | 12/2013 | Yamashita ............ H04L 45/124 370/401 |
| 2014/0007181 A1 | 1/2014 | Sarin et al. |
| 2014/0022894 A1 | 1/2014 | Oikawa et al. |
| 2014/0096229 A1 | 4/2014 | Burns et al. |
| 2014/0137240 A1 | 5/2014 | Smith et al. |
| 2014/0153577 A1* | 6/2014 | Janakiraman ........... H04L 47/28 370/392 |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0229641 A1 | 8/2015 | Sun et al. |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2017/0005986 A1 | 1/2017 | Bansal et al. |
| 2017/0063795 A1 | 3/2017 | Lian et al. |
| 2017/0134422 A1 | 5/2017 | Shieh et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0279770 A1 | 9/2017 | Woolward et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0191779 A1 | 7/2018 | Shieh et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

Specification, U.S. Appl. No. 14/673,679, filed Mar. 30, 2015.
Specification, U.S. Appl. No. 14/673,640, filed Mar. 30, 2015.
Specification, U.S. Appl. No. 14/677,827, filed Apr. 2, 2015.
Specification, U.S. Appl. No. 14/657,282, filed Mar. 13, 2015.
Specification, U.S. Appl. No. 14/657,210, filed Mar. 13, 2015.
Notice of Allowance dated Feb. 16, 2016, U.S. Appl. No. 14/673,640, filed Mar. 30, 2015.
Non-Final Office Action dated Jan. 28, 2016, U.S. Appl. No. 14/877,836, filed Oct. 7, 2015.
Non-Final Office Action dated Jul. 6, 2016, U.S. Appl. No. 15/151,303, filed May 10, 2016.
Final Office Action dated Jul. 7, 2016, U.S. Appl. No. 14/877,836, filed Oct. 7, 2015.
Non-Final Office Action dated Jul. 25, 2016, U.S. Appl. No. 15/090,523, filed Apr. 4, 2016.
Notice of Allowance dated Jul. 27, 2016, U.S. Appl. No. 15/080,519, filed Mar. 24, 2016.
Non-Final Office Action dated Aug. 2, 2016, U.S. Appl. No. 14/657,210, filed Mar. 13, 2015.
Non-Final Office Action dated Sep. 16, 2016, U.S. Appl. No. 15/209,275, filed Jul. 13, 2016.
Non-Final Office Action dated Jul. 14, 2016, U.S. Appl. No. 13/860,404, filed Apr. 10, 2013.
Non-Final Office Action dated Oct. 13, 2016, U.S. Appl. No. 15/199,605, filed Jun. 30, 2016.
International Search Report dated May 3, 2016 in Patent Cooperation Treaty Application No. PCT/US2016/024116 filed Mar. 24, 2016.
International Search Report dated May 3, 2016 in Patent Cooperation Treaty Application No. PCT/US2016/024300 filed Mar. 25, 2016.
International Search Report dated May 3, 2016 in Patent Cooperation Treaty Application No. PCT/US2016/024053 filed Mar. 24, 2016.
International Search Report dated May 6, 2016 in Patent Cooperation Treaty Application No. PCT/US2016/019643 filed Feb. 25, 2016.

(56) References Cited

OTHER PUBLICATIONS

International Search Report dated Jun. 20, 2016 in Patent Cooperation Treaty Application No. PCT/US2016/024310 filed Mar. 25, 2016, pp. 1-9.
"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, dated Jan. 12, 2017, 20 pages.
Final Office Action dated Jan. 18, 2017, U.S. Appl. No. 13/860,404, filed Apr. 10, 2013.
Final Office Action dated Apr. 19, 2017, U.S. Appl. No. 15/209,275, filed Jul. 13, 2016.
Notice of Allowance dated Apr. 21, 2017, U.S. Appl. No. 15/348,978, filed Nov. 10, 2016.
Final Office Action dated May 3, 2017, U.S. Appl. No. 15/199,605, filed Jun. 30, 2016.
Non-Final Office Action dated May 15, 2017, U.S. Appl. No. 14/657,210, filed Mar. 13, 2015.
Non-Final Office Action dated May 22, 2017, U.S. Appl. No. 15/008,298, filed Jan. 27, 2016.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.

\* cited by examiner

DIRECTING DATA TRAFFIC BETWEEN INTRA-SERVER VIRTUAL MACHINES

TECHNICAL FIELD

The present disclosure relates generally to data processing and, more specifically, to directing data traffic between intra-server virtual machines.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Conventionally, a virtual environment may include a hypervisor that is responsible for creating and running virtual machines. A system on which the hypervisor is running the virtual machines may be defined as a host or a virtual host. In the virtual environment, the hypervisor or the host can facilitate communications between multiple networks. Each of these networks may have a plurality of virtual machines. Some of these virtual machines may run on the same hypervisor despite being part of different networks.

A virtual machine of one network may attempt to communicate with a virtual machine of another network. Typically, when the first virtual machine sends data packets to the second virtual machine, the data packets need to be routed according to the traditional routing protocol and may involve sending the data packets via an external routing environment, even if both virtual machines are running on the same host. The external routing environment may be responsible for inspecting the data packets and determining, based on some predetermined policies, whether to allow the data packets to be routed between the first virtual machine and the second virtual machine. If the data packets are allowed, the hypervisor may route the data packet between the first virtual machine and the second virtual machine. Similarly, when the second virtual machine replies to the first virtual machine, a response data packet of the second virtual machine may also need to be routed to the external routing environment to determine whether the response data packet is allowed for routing to the first virtual machine. However, routing data packets between two virtual machines hosted by the same server, via an external routing environment, can result in inefficiencies in data communications between these virtual machines. Thus, intra-server data communication between virtual machines associated with different networks may be resource consuming, result in unnecessary utilization of network routing equipment, and limit the network bandwidth.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for improving data communications between intra-server virtual machines. In one example embodiment, a system for improving data communications between intra-server virtual machines may include a first virtual machine, a second virtual machine, and an intra-server routing module. The first virtual machine and the second virtual machine may be associated with the same server. The first virtual machine may be operable to establish data communications with a plurality of further virtual machines. Similarly, the second virtual machine may be operable to establish data communications with the plurality of further virtual machines. The intra-server routing module may be operable to receive, from the first virtual machine, a data packet directed to the second virtual machine. The data packet may be routed via an external routing environment.

Furthermore, the intra-server routing module may be operable to receive the data packet allowed for delivery to the second virtual machine via the external routing environment. Responsive to the receipt, it may be determined that a data flow associated with the data packet is allowed to be routed between the first virtual machine and the second virtual machine. Based on the determination, a unique identifier of the first virtual machine, in further data packets associated with the data flow, may be replaced with a first unique identifier and a unique identifier of the second virtual machine may be replaced with a second unique identifier. The first and the second unique identifiers may be associated with corresponding interfaces of the intra-server routing module. Subsequently, the data flow may be routed between the first virtual machine and the second virtual machine internally without having to be routed via the external routing environment.

In another example embodiment, a method for improving data communications between intra-server virtual machines may commence with receiving, by an intra-server routing module, from a first virtual machine, a data packet directed to a second virtual machine. The first virtual machine and the second virtual machine may be associated with the same server. The method may further include routing the data packet via an external routing environment. The method may continue with receiving, via the external routing environment, the data packet allowed for delivery to the second virtual machine. In response to the receipt, it may be determined that a data flow associated with the data packet is allowed to be routed between the first virtual machine and the second virtual machine. Based on the determination, a unique identifier of the first virtual machine may be replaced with a first unique identifier and a unique identifier of the second virtual machine may be replaced with a second unique identifier in further data packets associated with the data flow. The first unique identifier and the second unique identifier may be associated with corresponding interfaces of the intra-server routing module.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
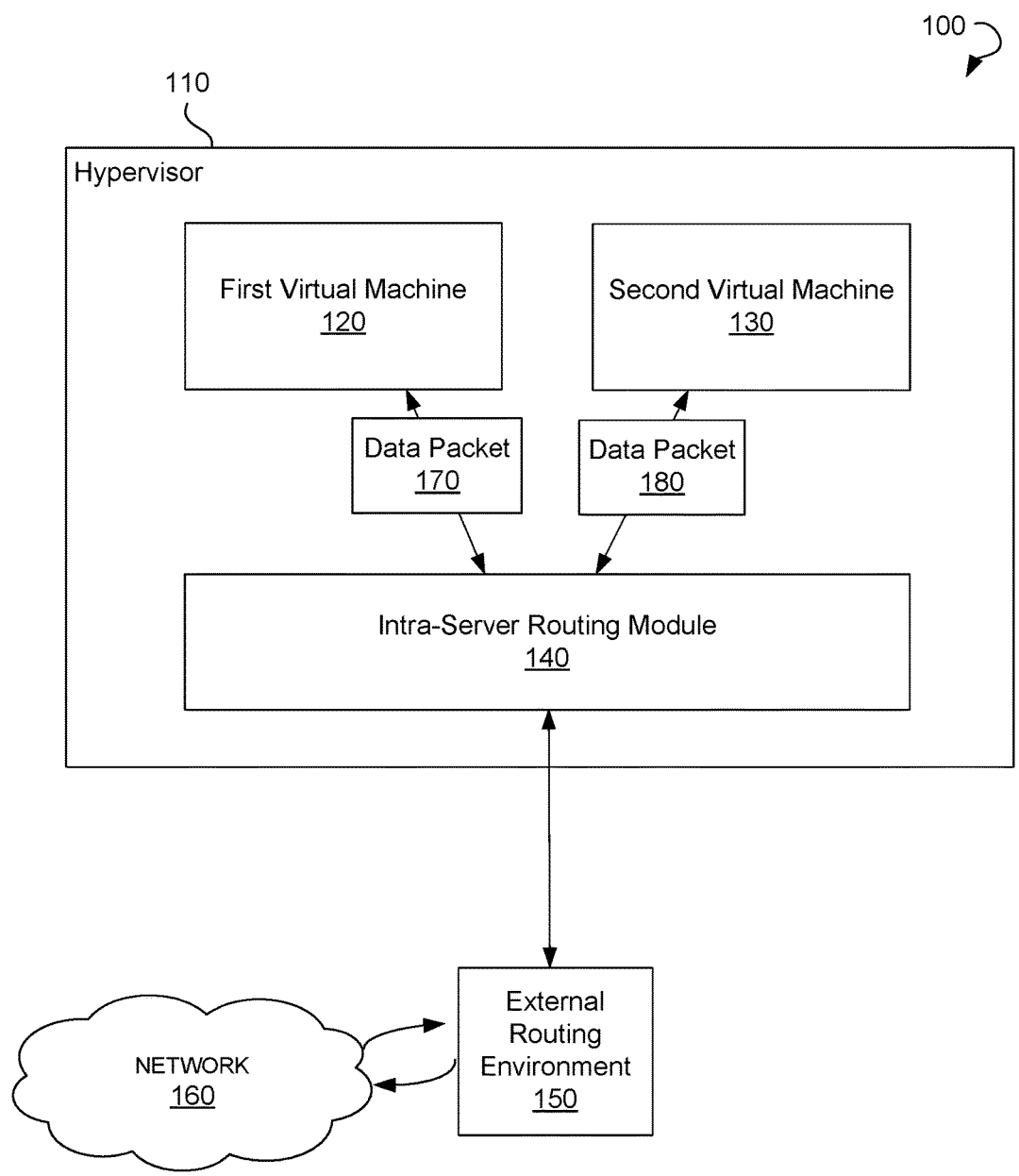
FIG. 1 is a block diagram illustrating an environment within which systems and methods for improving data communications between intra-server virtual machines can be implemented, in accordance with some embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

This disclosure provides methods and systems for improving data communications between intra-server virtual machines. This disclosure uses a virtual environment as an example, but it should be understood that the methods and systems discussed herein are equally applicable to a physical environment. In a virtual environment, virtual machines may be associated with multiple networks while running on the same hypervisor or different hypervisors of the same host/server. When one virtual machine of one network communicates with another virtual machine of another network, an intra-server routing module may route data packets between the virtual machines via an external routing environment even though both virtual machines are running on the same host. The external routing environment may be responsible for taking a decision as to whether data packets are allowed for delivery to destination devices based on some predetermined rules. If the external routing environment allows the data packets to be delivered, the external routing environment sends the data packets back to the intra-server routing module for further routing to the intended virtual machine.

The resources of the external network may be limited; therefore each time the data packets are routed via the external routing environment, the efficiency of the data communications between the virtual machines is reduced. Therefore, to increase efficiency of data communications between co-hosted virtual machines associated with different networks, the intra-server routing module may start routing data packets directly between the first virtual machine and the second virtual machine. However, before such direct routing can be established, it needs to be determined whether such routing can be allowed at all. Since enforcement of routing rules is normally lies in the domain of the external routing environment, in order to determine whether such routing is allowed for a data flow associated, the first data packet of the data flow may be still routed using the external routing environment.

More specifically, successful delivery of the first data packet routed via the external routing environment to the second virtual machine is an indication that the data packet is allowed for routing to the second virtual machine. This, in turn, indicates that the whole data flow (also referred to as a network session) associated with the data packet can be allowed between the first virtual machine and the second virtual machine. Upon determination that the data flow is allowed, further data packets associated with the data flow can be sent directly between the first virtual machine and the second virtual machine without leaving the host machine. To implement such direct routing of the data flow, the intra-server routing module may replace a unique identifier, such as, for example, a Media Access Control (MAC) address, of the first virtual machine with a unique identifier of a first interface of the intra-server routing module and replace a unique identifier of the second virtual machine with a unique identifier of a second interface of the intra-server routing module. Subsequently, the data flow may be routed directly between the virtual machines without having to leave the host.

It should be noted that the first virtual machine and the second virtual machine may be oblivious to the fact that the data packets are no longer routed via the external routing environment.

FIG. 1 illustrates an environment 100 within which systems and methods for improving data communications between intra-server virtual machines can be implemented, in accordance with some embodiments. The environment 100 may include a hypervisor 110, a first virtual machine 120, a second virtual machine 130, an intra-server routing module 140, and an external routing environment 150.

The hypervisor 110 may also serve as a host, or a virtual host, operable to run server or client programs. The host may be associated with a server (not shown), i.e. the host can be installed on the host. The server may be a virtual server as well. In case of the virtual server, virtual switches may be used to facilitate intra-server communications. As used herein, a virtual switch can include an intra-server routing module 140. The first virtual machine 120 and the second virtual machine 130 may be running on the same hypervisor 110. The intra-server routing module 140 may be operable to receive and forward data communications associated with the first virtual machine 120 and the second virtual machine 130.

The external routing environment 150 may include a virtual module located in a virtual environment or on a physical device be located in a physical environment. The physical environment may be associated with a network 160. The network 160 may include the Internet or any other network capable of communicating data between devices. Suitable networks may include or interface with any one or more of, for example, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 160 can further include or interface with any one or more of an RS-232 serial connection, an IEEE-1394 (FireWire) connection, a Fiber Channel connection, an infrared port, a Small Computer Systems Interface connection, a Universal Serial Bus connection or other wired or wireless, digital or analog interface or connection, mesh or Digi® networking. The network 160 may include a network of data processing nodes that are interconnected for the purpose of data communication.

To establish a network session with the second virtual machine 130, the first virtual machine 120 may send a data packet 170 to the intra-server routing module 140. The intra-server routing module 140 may be operable to receive the data packet 170 and send the data packet 170 via the external routing environment 150. The second virtual machine 130 may respond to the first virtual machine 120 by sending a data packet 180. The intra-server routing module 140 may receive the data packet 180 and all further data packets sent between the first virtual machine 120 and the second virtual machine 130 and send the received data packet 180 or further data packets directly to a destination device, either the first virtual machine 120 or the second virtual machine 130.

Figure 2:
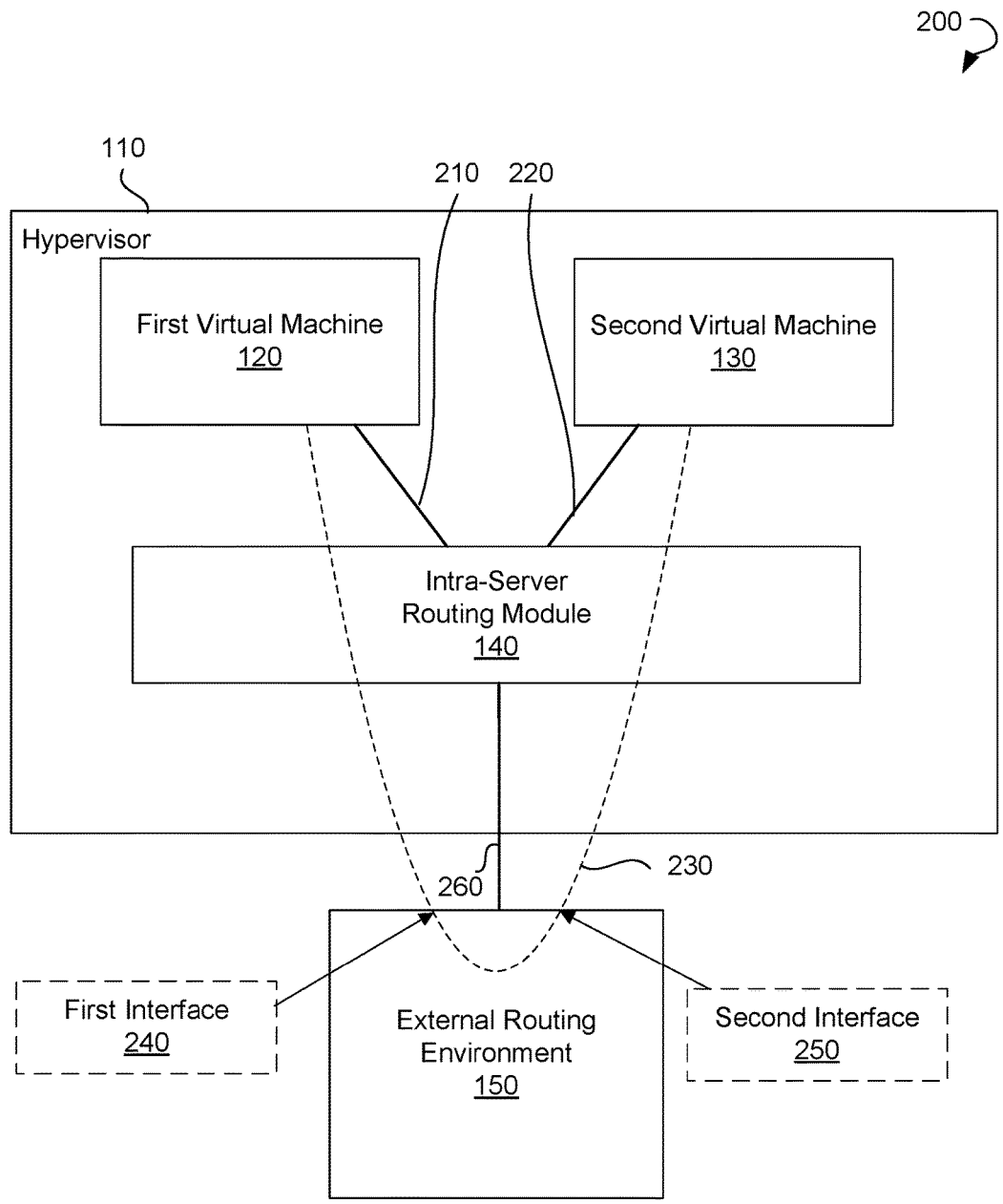
FIG. 2 is a block diagram illustrating data communications between intra-server virtual machines, in accordance with some embodiments.

FIG. 2 is a block diagram 200 illustrating conventional data communications between the first virtual machine 120 and the second virtual machine 130, according to an example embodiment. The first virtual machine 120 and the second virtual machine 130 may be associated with different networks. More specifically, a connection 210 is a connection of the intra-server routing module 140 with a first network including the first virtual machine 120. A connection 220 is a connection of the intra-server routing module 140 with a second network including the second virtual machine 130.

When the first virtual machine 120 attempts to communicate with the second virtual machine 130 by sending a data packet (not shown), the intra-server routing module 140 may receive the data packet directed to the second virtual machine 130 and route the data packet via an external routing environment 150. The data packet may be sent to the external routing environment 150 using a connection 260 between the intra-server routing module 140 and the external routing environment 150. Similarly, when the second virtual machine 130 replies to the first virtual machine 120 by sending a response data packet (not shown), the intra-server routing module 140 may receive the response data packet directed to the first virtual machine 120 and route the data packet via the external routing environment 150 using the connection 260. Therefore, a data communication 230 can be established between the external routing environment 150 and the first virtual machine 120 using identifiers of the first virtual machine 120 and identifiers associated with the external routing environment 150. The identifiers of the first virtual machine 120 may include an IP address, for example, 10.0.0.2/24, and a MAC address, for example, 00:00:00:00:00:03. The identifiers of the external routing environment 150 may include an IP address, for example, 10.0.0.1/24, and a MAC address, for example, 00:00:00:00:00:01, associated with a first interface 240 of the external routing environment 150.

The data communication 230 may also include a data communication between the external routing environment 150 and the second virtual machine 130 using identifiers of the second virtual machine 130 and the identifiers of the external routing environment 150. The identifiers of the second virtual machine 130 may include an IP address, for example, 20.0.0.2/24, and a MAC address, for example, 00:00:00:00:00:04. The identifiers of the external routing environment 150 may further include the IP address, for example, 20.0.0.1/24, and the MAC address, for example, 00:00:00:00:00:02, associated with a second interface 250 of the external routing environment 150.

Thus, the data packets cannot be sent directly to a destination device (namely the second virtual machine 130 for the data packets sent by the first virtual machine 120, and the first virtual machine 120 for the data packets sent by the second virtual machine 130), but need to be routed to the external routing environment 150 for determining whether the data packets are allowed to be routed to the destination device.

Figure 3:
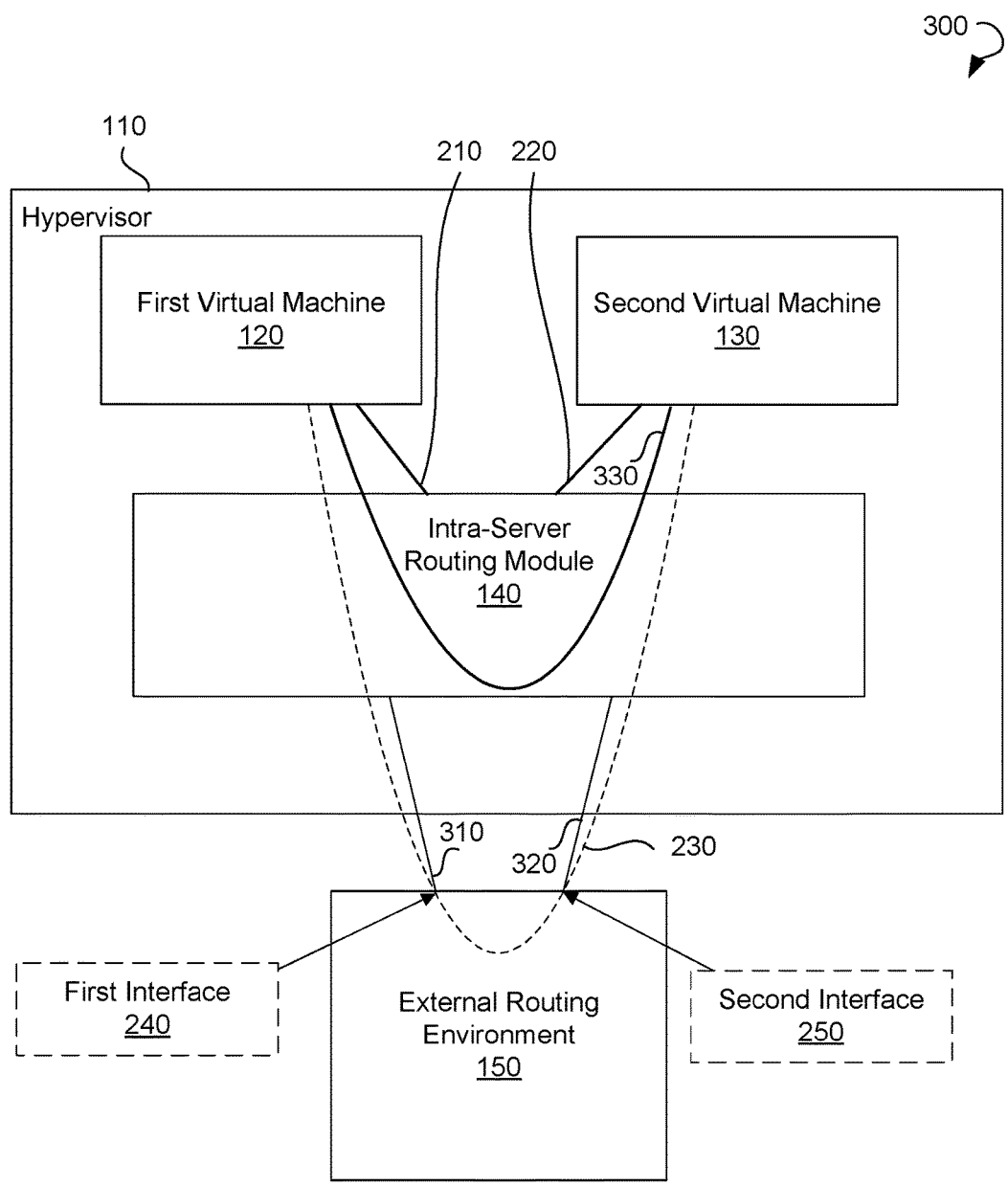
FIG. 3 is a block diagram illustrating data communications between intra-server virtual machines, in accordance with some embodiments.

FIG. 3 is a block diagram 300 illustrating data communications between the first virtual machine 120 and the second virtual machine 130, according to an example embodiment. The first virtual machine 120 and the second virtual machine 130 may run on the same hypervisor 110. However, the first virtual machine 120 and the second virtual machine 130 may be associated with different networks. The intra-server routing module 140 may be connected with the first virtual machine 120 using the connection 210 and with the second virtual machine 130 using the connection 220.

The first virtual machine 120 may attempt to communicate with the second virtual machine 130 by sending a first data packet (not shown) directed the second virtual machine 130. The intra-server routing module 140 may receive the first data packet and route the data packet via an external routing environment 150 using a connection 310 between the intra-server routing module 140 and the external routing environment 150. The connection 310 may be associated with the first interface 240 of the external routing environment 150.

In some embodiments, when the first data packet is a data packet sent by the second virtual machine 130 to the first virtual machine 120, the intra-server routing module 140 may route the data packet via the external routing environment 150 using a connection 320 between the intra-server routing module 140 and the external routing environment 150. The connection 320 may be associated with the second interface 250 of the external routing environment 150.

If the external routing environment 150 allows the first data packet to be routed to the second virtual machine 130, the intra-server routing module 140 may send the first data packet to the second virtual machine 130. Therefore, the data communication 230 may be established between the external routing environment 150 and the first virtual machine 120 using identifiers of the first virtual machine 120 and identifiers of the first interface 240 of the external routing environment 150. The data communication 230 may also include a data communication between the external routing environment 150 and the second virtual machine 130 using identifiers of the second virtual machine 130 and the identifiers of the second interface 250 of the external routing environment 150.

The intra-server routing module 140 may be operable to analyze data associated with all data communications that pass through the intra-server routing module 140 and recognize different data flows, for example, by attributing previously established data communications to a data flow. Thus, the intra-server routing module 140 determines which data flows are allowed by the external routing environment 150.

If the data flow between the first virtual machine 120 and the second virtual machine 130 is determined to be an allowed data flow, subsequent data packets transmitted between the first virtual machine 120 and the second virtual machine 130 may be transmitted directly to a destination device (the second virtual machine 130 for the data packets sent by the first virtual machine 120 and the first virtual machine 120 for the data packets sent by the second virtual machine 130) without routing the data packets via the external routing environment 150. More specifically, the second virtual machine 130 may send a further data packet to the first virtual machine 120. The further data packet may be received by the intra-server routing module 140. The intra-server routing module 140 may have records showing both the transmission of the first data packet from the first virtual machine 120 and the receipt of the first data packet by the second virtual machine 130. Therefore, the intra-server routing module 140 may associate the further data packet with the allowed data flow.

Subsequently, instead of forwarding the further data packet to the external routing environment 150, the intra-server routing module 140 may re-write a source MAC address (MAC address of the second virtual machine 130) in a packet header, such as, for example, an Ethernet packet header, of the further data packet with the MAC address of the intra-server routing module 140. After re-writing the MAC address, intra-server routing module 140 may pass the further data packet directly to the second virtual machine 130 without egressing the hypervisor 110. Thus, a connection 330 can be established between the first virtual machine 120 and the second virtual machine 130.

Similarly, when one of further data packets is a data packet sent by the first virtual machine 120 to the second virtual machine 130, the intra-server routing module 140 may re-write a source MAC address, i.e. a MAC address of the first virtual machine 120, in the data header of the data packet with the MAC address of the intra-server routing module 140. By establishing the connection 330, the network traffic may be offloaded from the interface of the hypervisor 110. Additionally, the network traffic may be offloaded from the external routing environment 150, thereby preventing network bottlenecks.

In an example embodiment, a network boundary may exist between the first virtual machine 120 and the second virtual machine 130. In this case, network tags associated with the first virtual machine 120 and the second virtual machine 130 may also be changed. For example, the first virtual machine 120 and the second virtual machine 130 may be associated with different Virtual Local Area Networks (VLANs). Therefore, VLAN tags associated with the first virtual machine 120 or the second virtual machine 130 may be re-written. Other examples of network boundaries may include boundaries associated with Virtual Extensible Local Area Networks, Network Virtualization using Generic Routing Encapsulation, and so forth. In further example embodiments, there may be no network boundary between the first virtual machine 120 and the second virtual machine 130.

Figure 4:
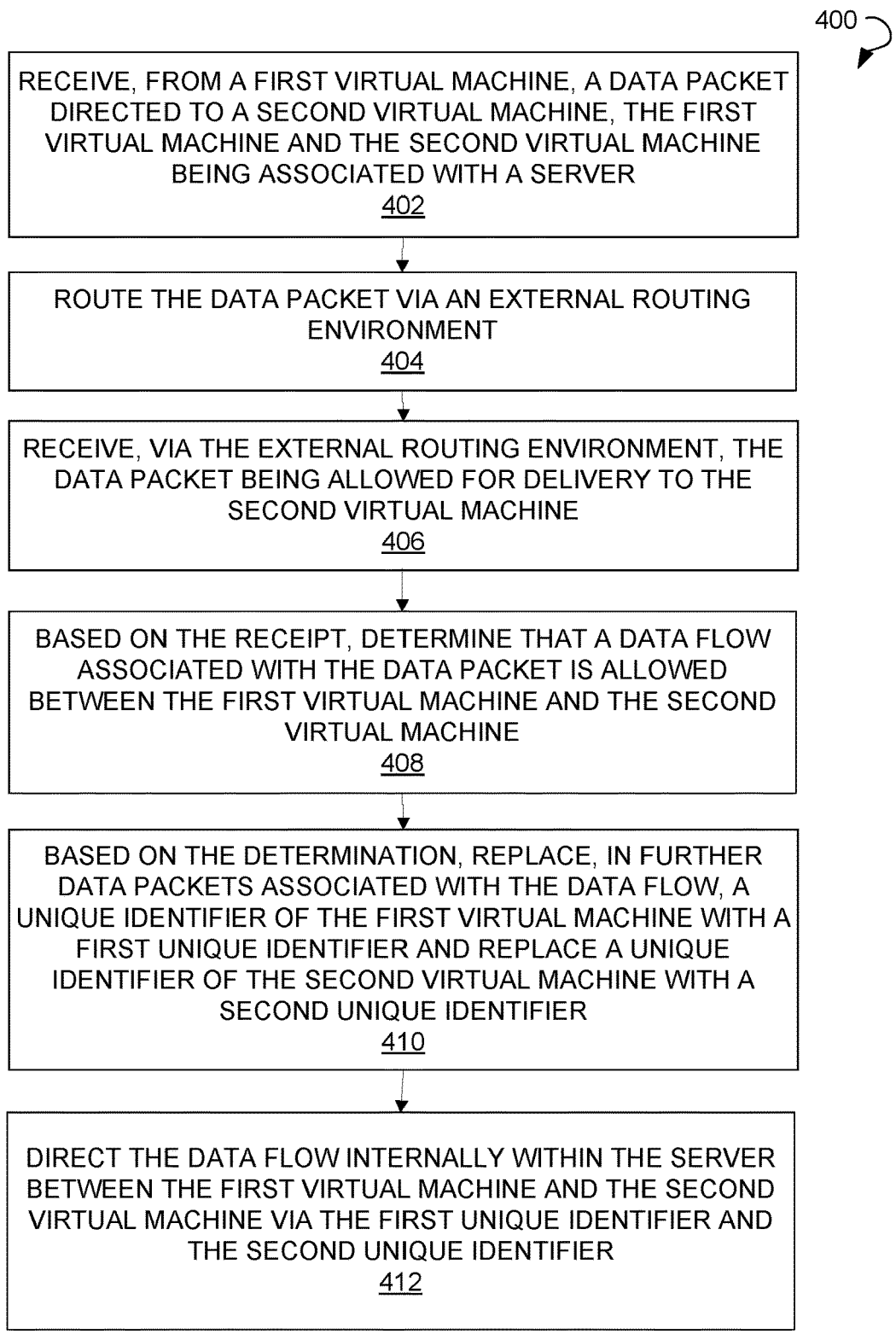
FIG. 4 is a flow chart illustrating a method for improving data communications between intra-server virtual machines, in accordance with some example embodiments.

FIG. 4 is a flow chart illustrating a method 400 for improving data communications between intra-server virtual machines, in accordance with some example embodiments. The method 400 may commence at operation 402 with receiving, by an intra-server routing module, from a first virtual machine, a data packet directed to a second virtual machine. The first virtual machine and the second virtual machine may be associated with the same server. In an example embodiment, the first virtual machine and the second virtual machine may be associated with at least one virtual host or at least one hypervisor, which, in turn, may be associated with the server. Furthermore, the first virtual machine may be associated with a first network and the second virtual machine may be associated with a second network.

At operation 404, the intra-server routing module may route the data packet via an external routing environment. In example embodiments, the external routing environment may include a virtual routing environment or a physical routing environment. In further example embodiments, the external routing environment may include one or more of the following: a Firewall, an intrusion prevention system, an intrusion detection system, a monitoring device, and so forth.

The intra-server routing module may receive, via the external routing environment, the data packet allowed for delivery to the second virtual machine at operation 406. In example embodiments, the data packet may be allowed by the external routing environment for delivery based on a predetermined policy. The predetermined policy may include a routing policy, a security policy, an access policy, and the like.

The method 400 may continue with operation 408 at which it may be determined that a data flow associated with the data packet is allowed between the first virtual machine and the second virtual machine. The determination may be made in response to the receipt of the data packet allowed by the external routing environment for delivery to the second virtual machine.

At operation 410, based on the determination that the data flow is allowed, a unique identifier of the first virtual machine may be replaced with a first unique identifier and a unique identifier of the second virtual machine may be replaced with a second unique identifier in further data packets associated with the data flow. The first unique identifier and the second unique identifier may be associated with corresponding network interfaces of the intra-server routing module. The unique identifier of the first virtual machine and the unique identifier of the second virtual machine may be replaced in one or more routing tables associated with the intra-server routing module.

In an example embodiment, the unique identifier associated with the first virtual machine may include a MAC address of the first virtual machine. The unique identifier associated with the second virtual machine may include a MAC address of the second virtual machine. The first unique identifier and the second unique identifier may include MAC addresses of interfaces associated with the intra-server routing module.

The method 400 may continue with directing the data flow between the first virtual machine and the second virtual machine using the first unique identifier and the second unique identifier at operation 412. The data flow may be directed internally within the server. In further example embodiments, the routing of the data packet via the external routing environment includes forwarding the data packet to an inline device by the intra-server routing module. The inline device may receive the data packet from the intra-server routing module and forward the data packet to the external routing environment.

The method 400 may further include inspecting the data communications within the server by a tap sensor. Based on the inspection, the tap sensor may determine that the further data packets are associated with the data packet that is allowed for routing. Based on such determination, the tap sensor may instruct the intra-server routing module to replace the unique identifier of the first virtual machine with the first unique identifier. Furthermore, the tap sensor may instruct the intra-server routing module to replace the unique identifier of the second virtual machine with the second unique identifier. In an example embodiment, the first virtual machine and the second virtual machine may be associated with at least one container described below with reference to FIG. 9. The at least one container may be associated with the server.

Figure 5:
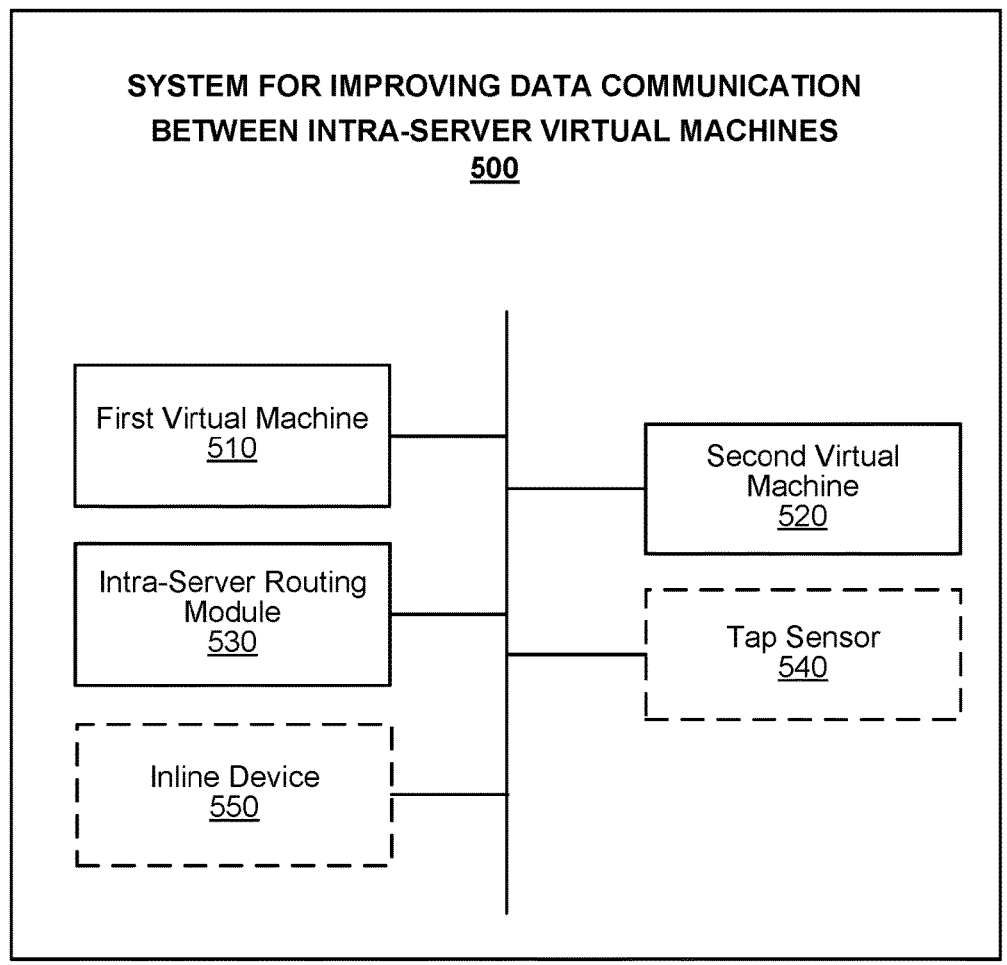
FIG. 5 is a block diagram illustrating various modules of a system for improving data communications between intra-server virtual machines, in accordance with certain embodiments.

FIG. 5 is a block diagram showing various modules of a system 500 for improving data communications between intra-server virtual machines, in accordance with certain embodiments. The system 500 may comprise a first virtual machine 510, a second virtual machine 520, an intra-server routing module 530, optionally, a tap sensor 540, and an inline device 550. The first virtual machine 510 may be operable to establish data communications with a plurality of further virtual machines. The second virtual machine 520 may be operable to establish the data communications with the plurality of further virtual machines. The first virtual machine 510 and the second virtual machine 520 may be associated with a server. Furthermore, the first virtual machine 510 may be associated with a first network and the second virtual machine 520 may be associated with a second network.

The intra-server routing module 530 may be operable to receive, from the first virtual machine 510, a data packet directed to the second virtual machine 520. Upon receipt of the data packet, the intra-server routing module 530 may be operable to route the data packet via an external routing environment. The intra-server routing module 530 may be further operable to receive, via the external routing environment, the data packet for delivery to the second virtual machine 520. In response to the receipt of the data packet from the external routing environment, the intra-server routing module 530 may determine that a data flow associated with the data packet is allowed for routing between the first virtual machine 510 and the second virtual machine 520. In some embodiments, the data packet may be allowed by the external routing environment for delivery based on a predetermined policy. The external routing environment may include a virtual routing environment or a physical routing environment. The external routing environment may include one or more of the following: a Firewall, an intrusion prevention system, an intrusion detection system, and so forth.

Based on the determination that the data flow is allowed, the intra-server routing module 530 may replace, in further data packets associated with the data flow, a unique identifier of the first virtual machine 510 with a first unique identifier. Furthermore, the intra-server routing module 530 may replace a unique identifier of the second virtual machine 520 with a second unique identifier. The first unique identifier and the second unique identifier may be associated with corresponding network interfaces of the intra-server routing module.

In some example embodiments, the unique identifier of the first virtual machine and the unique identifier of the second virtual machine may be replaced in one or more routing tables associated with the intra-server routing module. In an example embodiment, the unique identifier associated with the first virtual machine 510 may include a MAC address of the first virtual machine 510. The unique identifier associated with the second virtual machine 520 may include a MAC address of the second virtual machine 520. The first unique identifier and the second unique identifier may include MAC addresses associated with the intra-server routing module 530.

The intra-server routing module 530 may be further operable to direct the data flow between the first virtual machine 510 and the second virtual machine 520 via the first unique identifier and the second unique identifier associated with corresponding interfaces of the intra-server routing module 530. The data flow may be directed internally within the server.

The inline device 550 of the system 500 may be operable to receive the data packet from the intra-server routing module and forward the data packet via the external routing environment. The tap sensor 540 of the system 500 may be built into the inline device, and the tap sensor 540 may be operable to inspect the data communications within the server. The tap sensor 540 may inspect the data packet on its way to its destination. Based on the inspection, the tap sensor 540 may determine that the further data packets are associated with the data packet are allowed to be routed to their destination. The tap sensor 540 may be operable to instruct the intra-server routing module to replace the unique identifier associated with the first virtual machine 510 with the first unique identifier and replace the unique identifier associated with the second virtual machine 520 with the second unique identifier.

Figure 6:
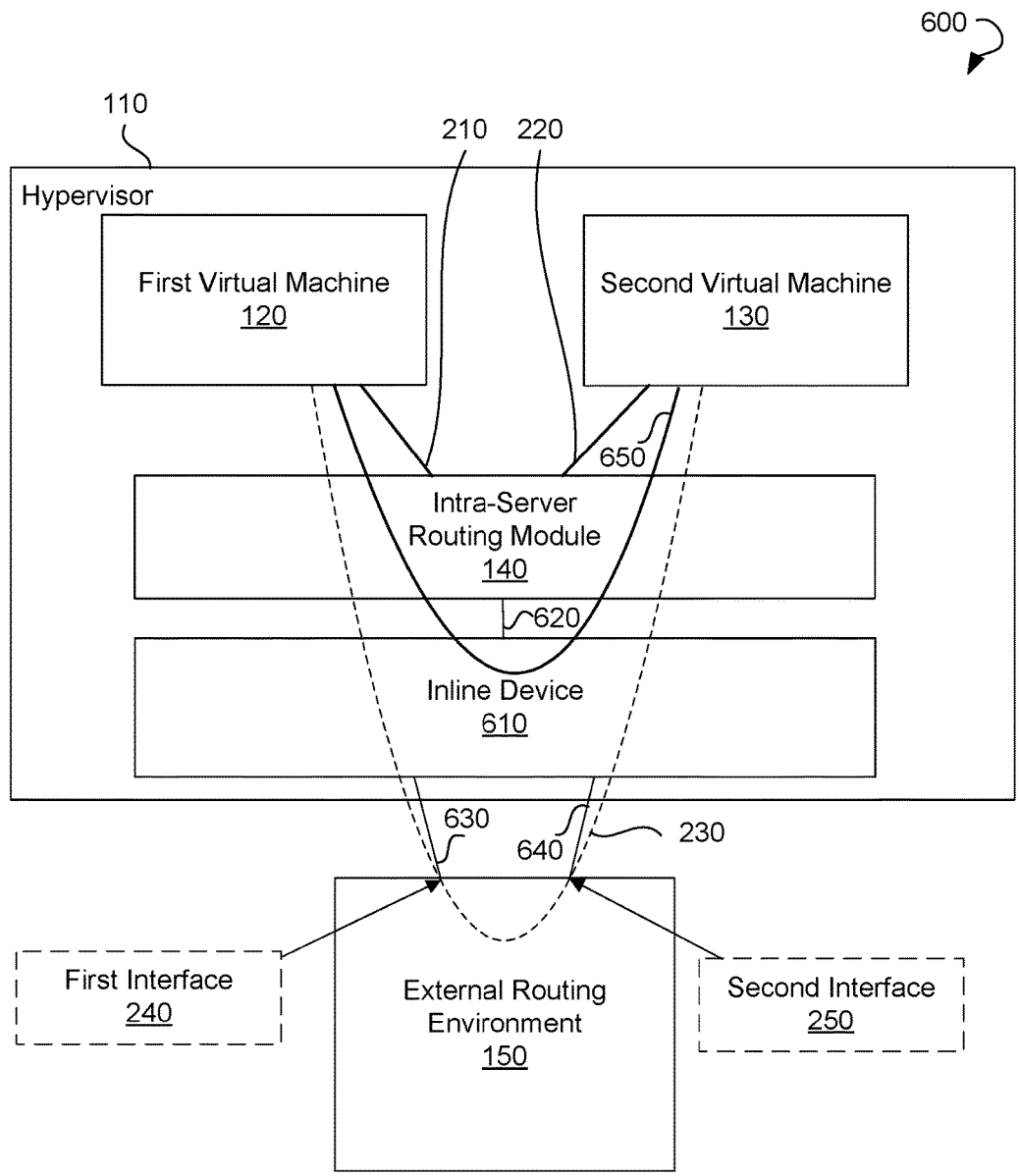
FIG. 6 is a block diagram illustrating data communications between intra-server virtual machines using an inline device connected to an intra-server routing module, in accordance with certain embodiments.

FIG. 6 is a block diagram 600 illustrating data communications between the first virtual machine 120 and the second virtual machine 130 using an inline device 610 connected to an intra-server routing module 140, according to an example embodiment. As shown in FIG. 6, an inline device 610 may be in communication with the intra-server routing module 140. In some example embodiments, the inline device 610 may be placed after the intra-server routing module 140, as shown in FIG. 6, or before the intra-server routing module 140 (not shown). The inline device 610 may be responsible for receiving a data packet of the first virtual machine 120 from the intra-server routing module 140 using a connection 620 between the inline device 610 and the intra-server routing module 140. The inline device 610 may forward the data packet to an external routing environment 150 via a connection 630 between the inline device 610 and the external routing environment 150. In other embodiments, when the data packet is sent by the second virtual machine 130, the inline device 610 may forward the data packet to the external routing environment 150 via a connection 640 between the inline device 610 and the external routing environment 150.

Upon receipt of the data packet from the external routing environment 150 for further forwarding to a second virtual machine 130, the inline device 610 may determine that a data flow between the first virtual machine 120 and the second virtual machine 130 is an allowed data flow. Consequently, the inline device 610 may replace identifiers in a process similar the one described above with reference to the replacement performed by the intra-server routing module 140. More specifically, the inline device 610 may replace, in further data packets associated with the data flow, a unique identifier of the first virtual machine 120 with a third unique identifier and replace a unique identifier of the second virtual machine 130 with a fourth unique identifier. The third unique identifier and the fourth unique identifier may be associated with corresponding interfaces of the inline device 610. Therefore, a connection 650 may be established for forwarding data packets between the first virtual machine 120 and the second virtual machine 130 using the inline device 610 and without ever leaving the hypervisor 110.

Figure 7:
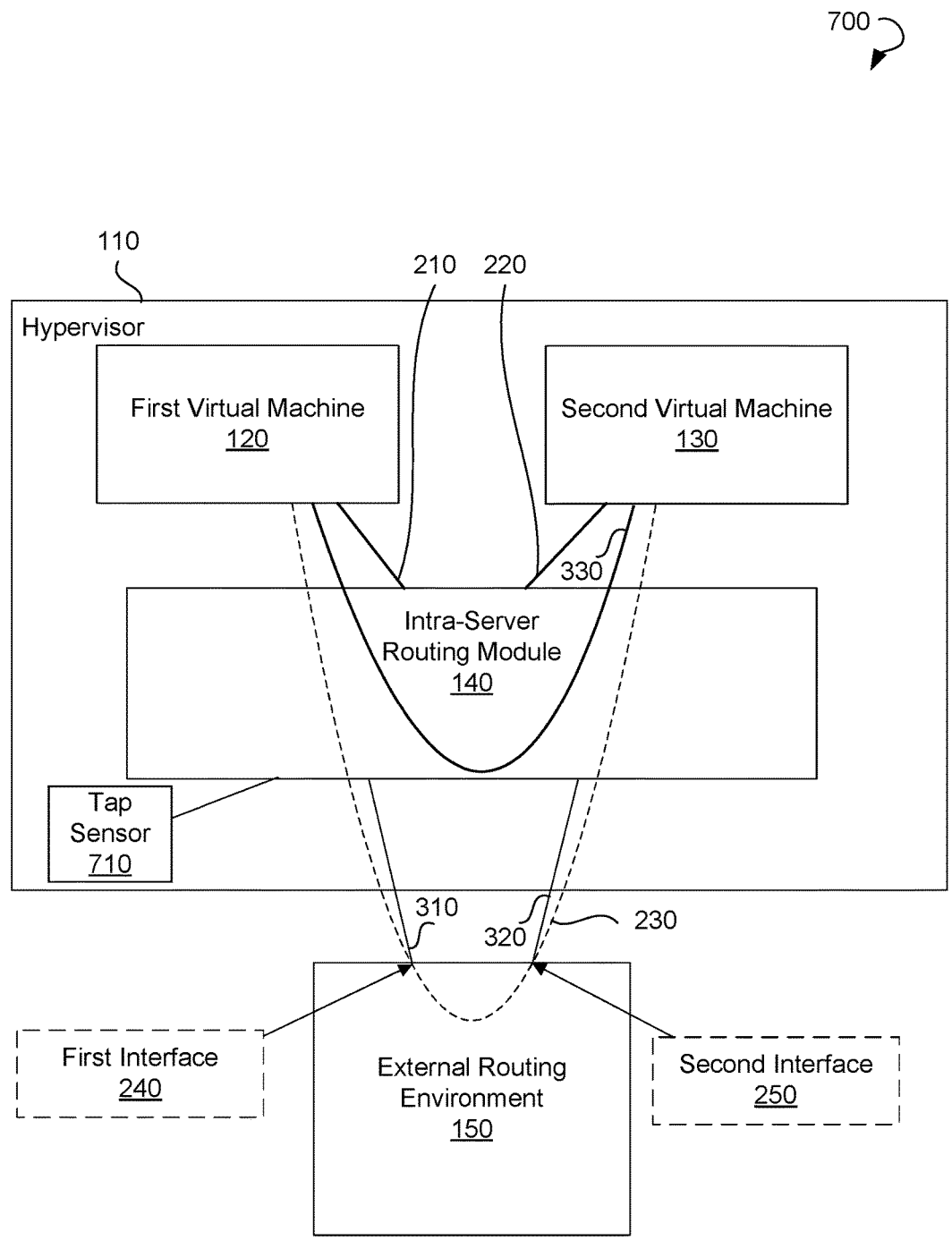
FIG. 7 is a block diagram illustrating data communications between virtual machines, in accordance with some embodiments.

FIG. 7 is a block diagram 700 illustrating data communications between the first virtual machine and the second virtual machine, according to an example embodiment. The intra-server routing module 140 may have a tap sensor 710. The tap sensor 710 may be a sensor operable in a tap mode for inspecting data traffic. While in the tap mode, the tap sensor 710 can receive and monitor a copy of every data packet passing through the intra-server routing module 140. The tap sensor 710 can inform the intra-server routing module 140 whether an allowed data packet is detected. More specifically, upon detection of the allowed data packet, the tap sensor 710 may instruct the intra-server routing module 140 to replace a unique identifier associated with the first virtual machine 120 with the first unique identifier of the intra-server routing module 140. Furthermore, the tap sensor 710 may instruct the intra-server routing module 140 to replace a unique identifier associated with the second virtual machine 130 with the second unique identifier of the intra-server routing module 140.

Figure 8:
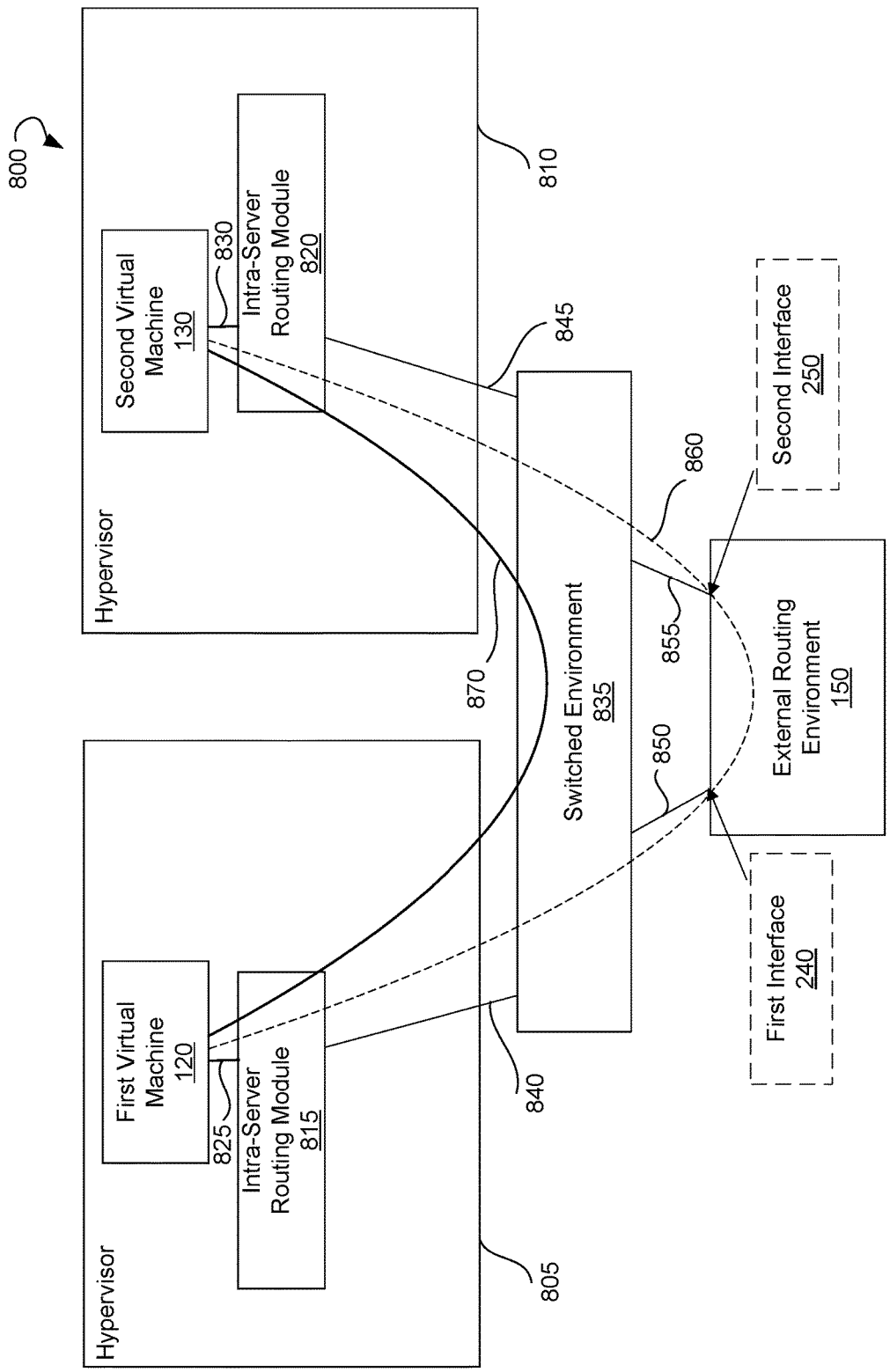
FIG. 8 is a block diagram illustrating data communications between virtual machines associated with different hypervisors, in accordance with some embodiments.

FIG. 8 is a block diagram 800 illustrating data communications between virtual machines associated with different hypervisors, according to an example embodiment. As shown on FIG. 8, the first virtual machine 120 may run on a first hypervisor shown as a hypervisor 805. The second virtual machine 130 may run on a second hypervisor shown as a hypervisor 810. The first virtual machine 120 and the second virtual machine 130 may be associated with different networks. The hypervisor 805 may communicate with an intra-server routing module 815 via a connection 825. The hypervisor 810 may communicate with an intra-server routing module 820 via a connection 830. The intra-server routing module 815 and the intra-server routing module 820 may communicate with a switched environment 835 via a connection 840 and a connection 845, respectively. More specifically, the intra-server routing module 815 and the intra-server routing module 820 may send data packets received from the first virtual machine 120 or the second virtual machine 130 to the switched environment 835. The switched environment 835 may route the data packets via an external routing environment 150 using a connection 850 if the data packet is received from the first virtual machine 120 or a connection 855 is the data packet is received from the second virtual machine 130. Thus, a connection 860 may be established for routing the data packets between the first virtual machine 120 and the second virtual machine 130 via the external routing environment 150.

Upon receipt of the data packet from the external routing environment 150, the switched environment 835 may determine that the data packet is allowed and, therefore, a data flow between the first virtual machine 120 and the second virtual machine 130 is allowed. The switched environment 835 may further perform an identifier replacement procedure by replacing the identifiers of the first virtual machine 120 and the second virtual machine 130 with identifiers of the switched environment 835. Thus, a connection 870 may be established for forwarding the data packets between the first virtual machine 120 and the second virtual machine 130 via the switched environment 835 without sending the data packets via the external routing environment 150.

Figure 9:
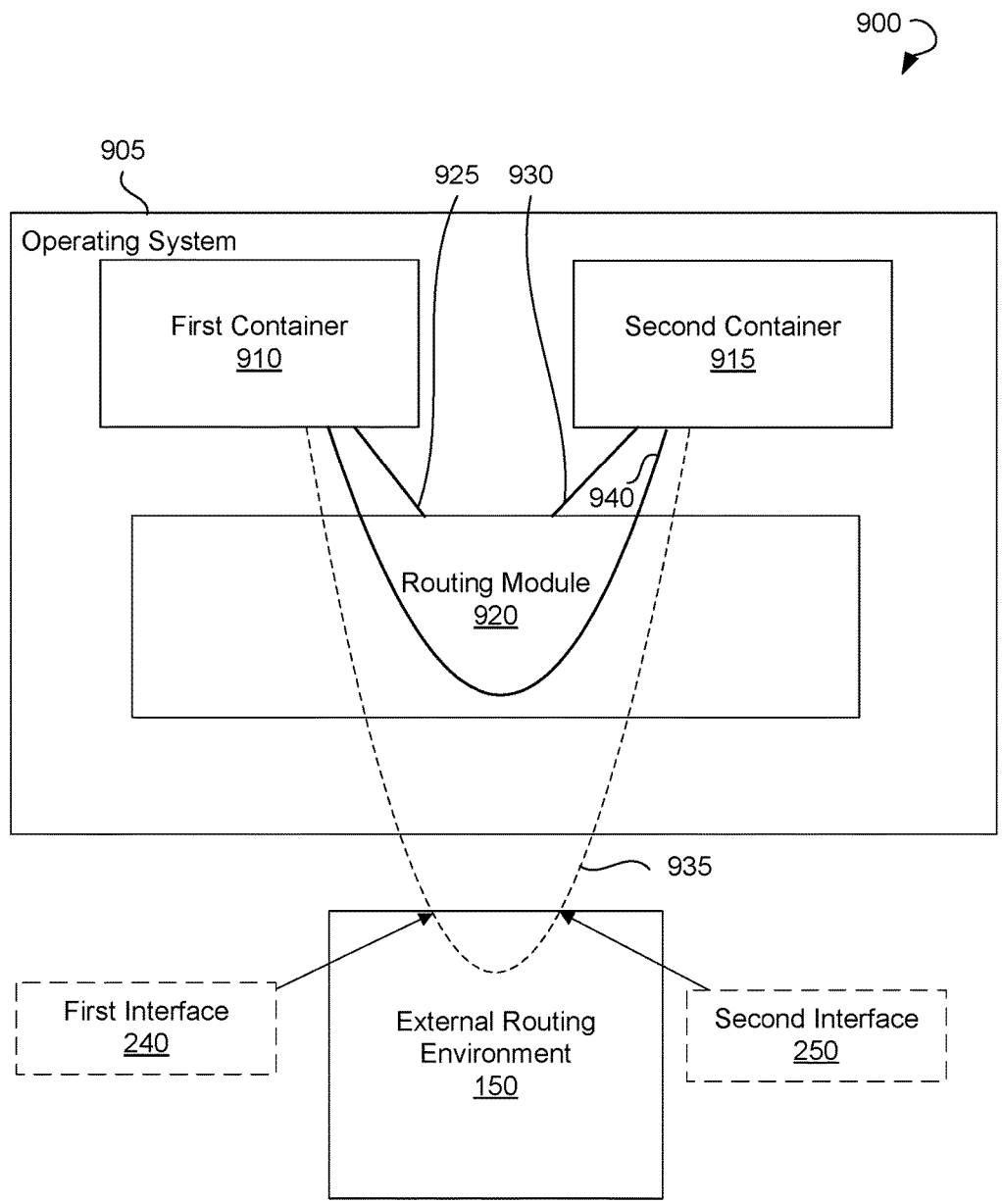
FIG. 9 is a block diagram illustrating data communications between containers associated with an operating system, in accordance with some embodiments.

FIG. 9 is a block diagram 900 illustrating data communications between containers associated with an operating system, according to an example embodiment. The block diagram 900 shows an embodiment for operating system level virtualization in which a kernel of an operating system runs on a hardware node with multiple isolated virtual machines. Such virtual machines of the operating system can be referred to as containers. As shown on FIG. 9, a first container 910 and a second container 915 may run on an operating system 905. Furthermore, the first container 910 and the second container 915 may be associated with different networks. The routing module 920 may be connected to the first container 910 using a connection 925 and to the second container 915 using a connection 930.

The first container 910 may attempt to communicate with the second container 915 by sending a data packet directed to the second container 915. The routing module 920 may receive the data packet and route the data packet via an external routing environment 150. If the external routing environment 150 allows the data packet to be sent to the second container 915, the routing module 920 may send the data packet to the second container 915. Thus, a data communication 935 may be established between the external routing environment 150 and the first container 910 using identifiers of the first container 910 and identifiers of the first interface 240 of the external routing environment 150. The data communication 935 may also include a data communication between the external routing environment 150 and the second container 915 using identifiers of the second container 915 and the identifiers of the second interface 250 of the external routing environment 150.

Once the data flow between the first container 910 and the second container 915 is determined as allowed, subsequent data packets of the data flow may be transmitted between the first container 910 and the second container 915 using the routing module 920 without routing the further data packets via the external routing environment 150. More specifically, the second container 915 may send a further data packet to the first container 910. The further data packet may be received by the routing module 920. The routing module 920 may associate the further data packet with the allowed data flow between the first container 910 and the second container 915. Instead of forwarding the further data packet to the external routing environment 150, the routing module 920 may re-write a source MAC address (MAC address of the second container 915) in a data header of the further data packet with the MAC address of the routing module 920. After re-writing the MAC address, the routing module 920 may pass the further data packet directly to the first container 910 without leaving the operating system 905. Thus, a data communication 940 may be established between the first container 910 and the second container 915.

Similarly, when one of further data packets is a data packet sent by the first container 910 to the second container 915, the routing module 920 may re-write a source MAC address, i.e. a MAC address of the first container 910, in the header of the data packet with the MAC address of the routing module 920.

Figure 10:
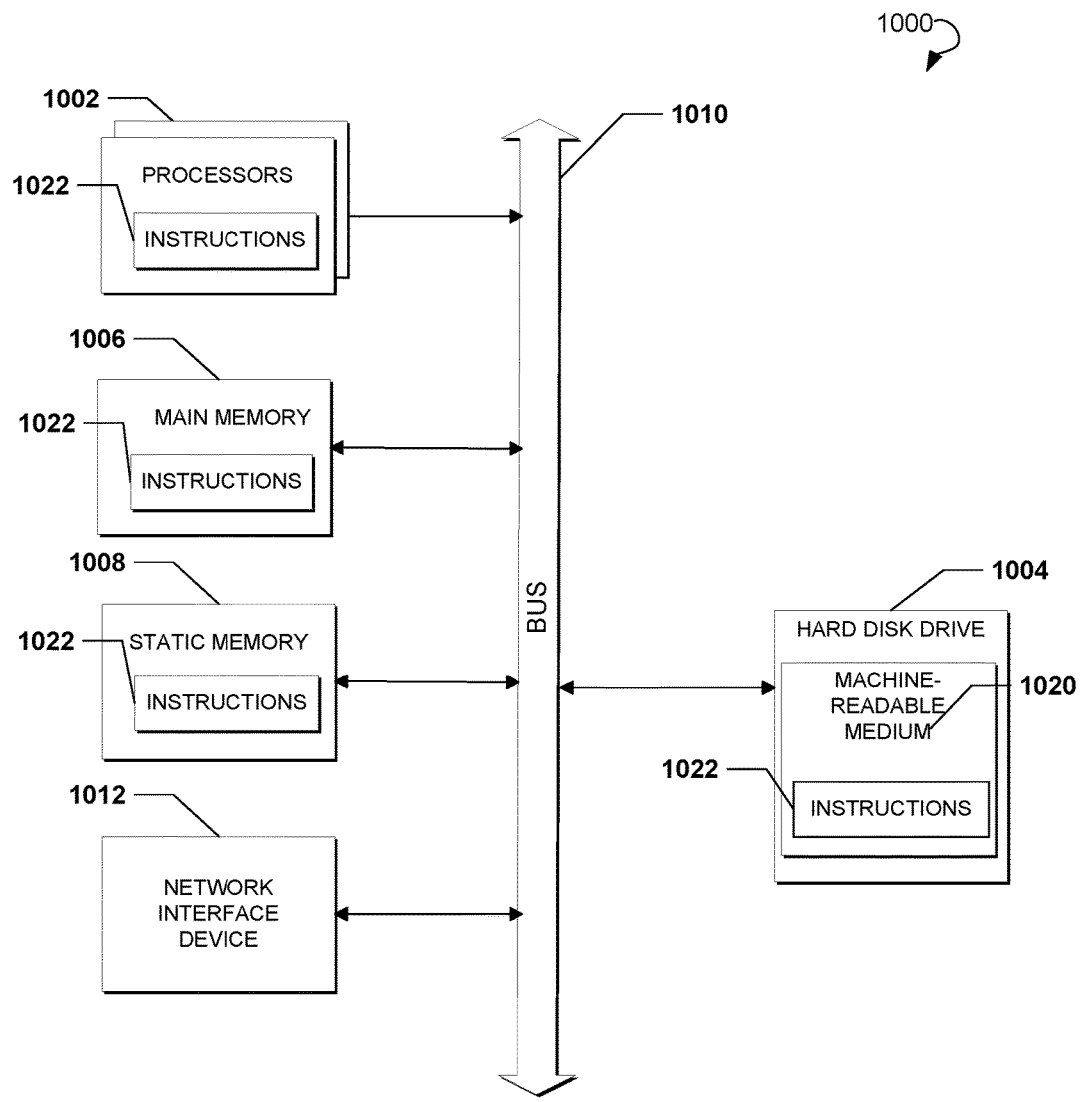
FIG. 10 shows a diagrammatic representation of a computing device for a machine in the exemplary electronic form of a computer system, within which a set of instructions for causing the machine to perform any one or more of the methodologies discussed herein, can be executed.

FIG. 10 shows a diagrammatic representation of a computing device for a machine in the exemplary electronic form of a computer system 1000, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processor or multiple processors 1002, a hard disk drive 1004, a main memory 1006, and a static memory 1008, which communicate with each other via a bus 1010. The computer system 1000 may also include a network interface device 1012. The hard disk drive 1004 may include a computer-readable medium 1020, which stores one or more sets of instructions 1022 embodying or utilized by any one or more of the methodologies or functions described herein. The instructions 1022 can also reside, completely or at least partially, within the main memory 1006 and/or within the processors 1002 during execution thereof by the computer system 1000. The main memory 1006 and the processors 1002 also constitute machine-readable media.

While the computer-readable medium 1020 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory, read-only memory, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

Thus, systems and methods for improving data communications between intra-server virtual machines are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for improving data communications between intra-server virtual machines, the system comprising:
   network interfaces;
   at least one hardware processor communicatively coupled to the network interfaces;
   an intra-server routing module implemented by the at least one hardware processor; and
   a memory communicatively coupled to the at least one hardware processor, the memory storing instructions which are executable by the at least one hardware processor to perform a method comprising:
   receiving, by the intra-server routing module, a first data packet from a first virtual machine directed to a second virtual machine, the first virtual machine and the second virtual machine being associated with the same server;
   without inspection from the intra-server routing module, providing to an inline device the first data packet, the inline device forwarding the first data packet to an external routing environment;
   receiving, by the intra-server routing module, the first data packet from the external routing environment being allowed for delivery to the second virtual machine based on a predetermined policy;
   determining, by a tap sensor, that a data flow associated with the first data packet is allowed between the first virtual machine and the second virtual machine using the receipt of the first data packet, the data flow including data packets from the first virtual machine directed to the second virtual machine and data packets from the second virtual machine directed to the first virtual machine;
   using the determination, replacing, by the intra-server routing module, in second data packets of the allowed data flow, a unique identifier of the first virtual machine with a first unique identifier, and replacing a unique identifier of the second virtual machine with a second unique identifier, the first unique identifier and the second unique identifier being associated with the network interfaces of the intra-server routing module; and
   directing, by the intra-server routing module, the allowed data flow between the first virtual machine and the second virtual machine using the first unique identifier and the second unique identifier associated with the intra-server routing module, the allowed data flow being directed internally within the server.

2. The system of claim 1, wherein the unique identifier associated with the first virtual machine includes a Media Access Control (MAC) address of the first virtual machine, the unique identifier associated with the second virtual machine includes a MAC address of the second virtual machine, and the first unique identifier and the second unique identifier include MAC addresses of the intra-server routing module.

3. The system of claim 1, wherein the external routing environment includes at least one of: a virtual routing environment and a physical routing environment.

4. The system of claim 1, wherein the method further comprises: receiving instructions, from a tap sensor built into the inline device, to replace the unique identifier of the first virtual machine with the first unique identifier and replace the unique identifier of the second virtual machine with the second unique identifier, the tap sensor inspecting data communications within the server and determining the second data packets are associated with the first data packet being allowed using the inspection.

5. The system of claim 1, wherein the unique identifier of the first virtual machine and the unique identifier of the second virtual machine are replaced in one or more routing tables associated with the intra-server routing module.

6. The system of claim 1, wherein the external routing environment includes one or more of the following:
   a Firewall, an intrusion prevention system, and an intrusion detection system.

7. The system of claim 1, wherein the first virtual machine is associated with a first network and the second virtual machine is associated with a second network.

8. A method by an intra-server routing module for data communications between intra-server virtual machines comprising:
   receiving, by the intra-server routing module, a first data packet from a first virtual machine directed to a second virtual machine, the first virtual machine and the second virtual machine being associated with the same server;
   without inspection from the intra-server routing module, providing to an inline device the first data packet, the inline device forwarding the first data packet to an external routing environment;
   receiving, by the intra-server routing module, the first data packet from the external routing environment being allowed for delivery to the second virtual machine based on a predetermined policy;
   determining, by a tap sensor, that a data flow associated with the first data packet is allowed between the first virtual machine and the second virtual machine using the receipt of the first data packet, the data flow including data packets from the first virtual machine directed to the second virtual machine and data packets from the second virtual machine directed to the first virtual machine;
   using the determination, replacing, by the intra-server routing module, in second data packets of the allowed data flow, a unique identifier of the first virtual machine with a first unique identifier, and replacing a unique identifier of the second virtual machine with a second unique identifier, the first unique identifier and the second unique identifier being associated with network interfaces of the intra-server routing module; and
   directing, by the intra-server routing module, the allowed data flow between the first virtual machine and the second virtual machine using the first unique identifier and the second unique identifier associated with the intra-server routing module, the allowed data flow being directed internally within the server.

9. The method of claim 8, wherein the unique identifier associated with the first virtual machine includes a MAC address of the first virtual machine, the unique identifier associated with the second virtual machine includes a MAC address of the second virtual machine, and the first unique identifier and the second unique identifier include MAC addresses of the intra-server routing module.

10. The method of claim 8, wherein the external routing environment includes at least one of: a virtual routing environment and a physical routing environment.

11. The method of claim 8, further comprising:
   receiving instructions, from a tap sensor built into the inline device, to replace the unique identifier of the first virtual machine with the first unique identifier and replace the unique identifier of the second virtual machine with the second unique identifier, the tap sensor inspecting data communications within the server and determining the second data packets are associated with the first data packet being allowed using the inspection.

12. The method of claim 11, wherein the first virtual machine and the second virtual machine are associated with at least one virtual host or at least one container, the at least one virtual host and the at least one container being associated with the server.

13. The method of claim 8, wherein the unique identifier of the first virtual machine and the unique identifier of the second virtual machine are replaced in one or more routing tables associated with the intra-server routing module.

14. The method of claim 8, wherein the external routing environment includes one or more of the following: a Firewall, an intrusion prevention system, and an intrusion detection system.

15. The method of claim 8, wherein the first virtual machine is associated with a first network and the second virtual machine is associated with a second network.

\* \* \* \* \*